US012486051B2

(12) United States Patent
Adhikari et al.

(10) Patent No.: US 12,486,051 B2
(45) Date of Patent: Dec. 2, 2025

(54) COMPUTERIZED AIRCRAFT FAULT ISOLATION

(71) Applicant: The Boeing Company, Arlington, VA (US)

(72) Inventors: Partha Adhikari, Bengaluru (IN); Surya Pratap Singh Yadav, Bengaluru (IN); Bhanu P. Thakur, Bengaluru (IN); Seema Chopra, Bengaluru (IN)

(73) Assignee: The Boeing Company, Arlington, VA (US)

( * ) Notice: Subject to any disclaimer, the term of this patent is extended or adjusted under 35 U.S.C. 154(b) by 286 days.

(21) Appl. No.: 18/310,908

(22) Filed: May 2, 2023

(65) Prior Publication Data

US 2024/0367821 A1  Nov. 7, 2024

(51) Int. Cl.
*B64F 5/60*  (2017.01)

(52) U.S. Cl.
CPC ..................................... *B64F 5/60* (2017.01)

(58) Field of Classification Search
CPC ........................................................ B64F 5/60
See application file for complete search history.

(56) References Cited

U.S. PATENT DOCUMENTS

| | | | |
|---|---|---|---|
| 7,260,505 B2 * | 8/2007 | Felke | G05B 23/0283 702/182 |
| 10,650,614 B2 | 5/2020 | Huber et al. | |
| 10,787,278 B2 * | 9/2020 | Huber | G07C 5/0808 |
| 10,867,455 B2 * | 12/2020 | Segal | G07C 5/008 |
| 11,325,725 B2 * | 5/2022 | Saito | B64F 5/40 |
| 11,807,389 B2 * | 11/2023 | Bushkov | B64D 45/00 |
| 2019/0180527 A1 | 6/2019 | Segal et al. | |
| 2024/0132230 A1 * | 4/2024 | Adhikari | G07C 5/006 |

(Continued)

OTHER PUBLICATIONS

European Patent Office, Extended European Search Report Issued in Application No. 24170359.4, Oct. 4, 2024, 9 pages.

(Continued)

*Primary Examiner* — Michael A Berns
(74) *Attorney, Agent, or Firm* — Alleman Hall & Tuttle LLP

(57) ABSTRACT

A method for computerized aircraft fault isolation includes, at a computing device, receiving a current maintenance-related pattern that includes a set of one or more digital maintenance messages reported during a flight of an aircraft. The current maintenance-related pattern is compared to a digital maintenance records database that includes a plurality of historical maintenance-related patterns observed during prior aircraft flights, each associated with an indication of one or more aircraft parts that, when replaced, resolved an underlying fault corresponding to the historical maintenance-related pattern. Based on an adaptive similarity threshold, a selected set of historical maintenance-related patterns are computer-identified as corresponding to the current maintenance-related pattern. A selected aircraft part associated with the selected set of historical maintenance-related patterns is computer-identified as a candidate for replacement on the aircraft to address the current maintenance-related pattern.

20 Claims, 11 Drawing Sheets

(56) References Cited

U.S. PATENT DOCUMENTS

2024/0367821 A1* 11/2024 Adhikari ................ G06Q 10/20

OTHER PUBLICATIONS

European Patent Office, Notice of Publication Issued in Application No. 24170359.4, Oct. 9, 2024, 2 pages.
Mengshoel, O.J. et al., "Probabilistic Model-Based Diagnosis: An Electrical Power System Case Study," IEEE Transactions on Systems, Man, and Cybernetics, Part A, vol. 40, No. 5, Jul. 19, 2010, 12 pages.
Pei, J. et al., "PrefixSpan: Mining Sequential Patterns Efficiently by Prefix-Projected Pattern Growth," Proceedings of 17th International Conference on Data Engineering, Apr. 2, 2001, Heidelberg, Germany, 10 pages.

* cited by examiner

| Tail No. | Leg Date | Pattern |
|---|---|---|
| 5YKZG | 2023-01-01 19:21:00 | L Cabin Deflector Door Actuator Fail, L Cabin Deflector Door Sensor Fail, CPRSR DEFLECTOR DOOR L |

◄─ 310   ◄─ 312

304 ─►

SELECTED HISTORICAL MAINTENANCE-RELATED PATTERN 600

PRIOR AIRCRAFT PART REPLACEMENT 602A
NUMBER OF PRIOR DOCUMENTED REPLACEMENTS 604A
FAULT-RESOLUTION LIKELIHOOD 606A

PRIOR AIRCRAFT PART REPLACEMENT 602B
NUMBER OF PRIOR DOCUMENTED REPLACEMENTS 604B
FAULT-RESOLUTION LIKELIHOOD 606B

```
┌─────────────────────────────────────────────────────────┐
│ RECEIVE A CURRENT SENSOR-RELATED PATTERN INCLUDING A    │
│ SET OF ONE OR MORE DIGITAL SENSOR VALUES REPORTED       │
│ DURING A FLIGHT OF AN AIRCRAFT                          │
│                                                     702 │
└─────────────────────────────────────────────────────────┘
                            │
                            ▼
┌─────────────────────────────────────────────────────────┐
│ COMPARE THE CURRENT SENSOR-RELATED PATTERN TO A         │
│ DIGITAL SENSOR RECORDS DATABASE                         │
│                                                     704 │
└─────────────────────────────────────────────────────────┘
                            │
                            ▼
┌─────────────────────────────────────────────────────────┐
│ COMPUTER-IDENTIFY A SELECTED SET OF HISTORICAL SENSOR-  │
│ RELATED PATTERNS AS CORRESPONDING TO THE CURRENT        │
│ SENSOR-RELATED PATTERN                                  │
│                                                     706 │
└─────────────────────────────────────────────────────────┘
                            │
                            ▼
┌─────────────────────────────────────────────────────────┐
│ COMPUTER-IDENTIFY A SELECTED AIRCRAFT PART ASSOCIATED   │
│ WITH THE SELECTED SET OF HISTORICAL SENSOR-RELATED      │
│ PATTERNS AS A CANDIDATE FOR REPLACEMENT ON THE          │
│ AIRCRAFT                                            708 │
└─────────────────────────────────────────────────────────┘
```

FIG. 7

COMPUTERIZED AIRCRAFT FAULT ISOLATION

FIELD

The present disclosure relates generally to aircraft fault isolation, and more particularly, to identifying a candidate aircraft part for replacement to address an observed maintenance-related pattern.

BACKGROUND

Modern aircraft are highly complicated systems, typically including thousands of unique parts and components, each having different functions. When any particular part exhibits a fault or failure—e.g., due to wear-and-tear—diagnosing and resolving the issue can require a significant investment of time and resources. In some cases, multiple unsuccessful fixes are attempted before the root issue is identified. This can lead to significant downtime for the aircraft, causing operational disruptions and potential financial losses.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a method for computerized aircraft fault isolation includes, at a computing device, receiving a current maintenance-related pattern that includes a set of one or more digital maintenance messages reported during a flight of an aircraft. The current maintenance-related pattern is compared to a digital maintenance records database that includes a plurality of historical maintenance-related patterns observed during prior aircraft flights, each associated with an indication of one or more aircraft parts that, when replaced, resolved an underlying fault corresponding to the historical maintenance-related pattern. Based on an adaptive similarity threshold, a selected set of historical maintenance-related patterns are computer-identified as corresponding to the current maintenance-related pattern. A selected aircraft part associated with the selected set of historical maintenance-related patterns is computer-identified as a candidate for replacement on the aircraft to address the current maintenance-related pattern.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIG. 6 schematically shows a selected historical maintenance-related pattern associated with indications of prior aircraft parts replaced for the pattern.

FIG. 7 illustrates an example method for computerized aircraft fault isolation based on a current sensor-related pattern.

DETAILED DESCRIPTION

When aircraft faults arise, they are often signified by a set of one or more digital maintenance messages reported by on-board monitoring systems, and/or digital sensor values that deviate from their typical ranges. It can be difficult to resolve a particular set of digital maintenance messages and/or abnormal sensor readings to a specific actionable fault. In one example, failure of a particular component on board an aircraft (e.g., hydraulic valve) causes degraded performance of a downstream subsystem (e.g., flight control surface). On-board monitoring systems detect the degraded performance, and output digital maintenance messages indicating that problems are detected. However, there could be many different possible faults, associated with many different possible aircraft parts, that would cause the observed performance degradation and thereby explain the specific pattern of digital maintenance messages that are observed. Aircraft faults can therefore require significant time and effort to investigate and ultimately resolve, contributing to operational delays.

Accordingly, the present disclosure is directed to techniques for computerized fault isolation. Specifically, the present disclosure describes techniques for identifying an aircraft part as a candidate for replacement, based at least in part on a current pattern of digital maintenance messages and/or Flight Deck Effects (FDEs) detected during a flight of an aircraft, and a digital maintenance records database that includes a plurality of historical maintenance-related patterns observed during prior aircraft flights. Each historical maintenance-related pattern is associated with an indication of one or more aircraft parts that, when replaced, resolved an underlying fault that caused the historical maintenance-related pattern. Using an adaptive similarity threshold, a selected set of one or more historical maintenance-related patterns are identified as corresponding to the current maintenance-related pattern. An aircraft part associated with the selected set of historical maintenance-related patterns is then identified as a candidate for replacement.

The techniques described herein beneficially enable faster and more accurate identification of aircraft faults underlying any particular set of maintenance messages. This serves to reduce the percentage of failures classified as "cannot duplicate," "no-fault found," or "re-test OK," which reduces the amount of time required to investigate and diagnose aircraft faults. Furthermore, in some examples, the techniques described herein are useable to generate historical replacement and fault-resolution likelihood statistics that can be used to improve maintenance scheduling and part ordering, thereby providing an improvement to human-computer interaction for the purpose of aircraft fault isolation.

Figure 1:
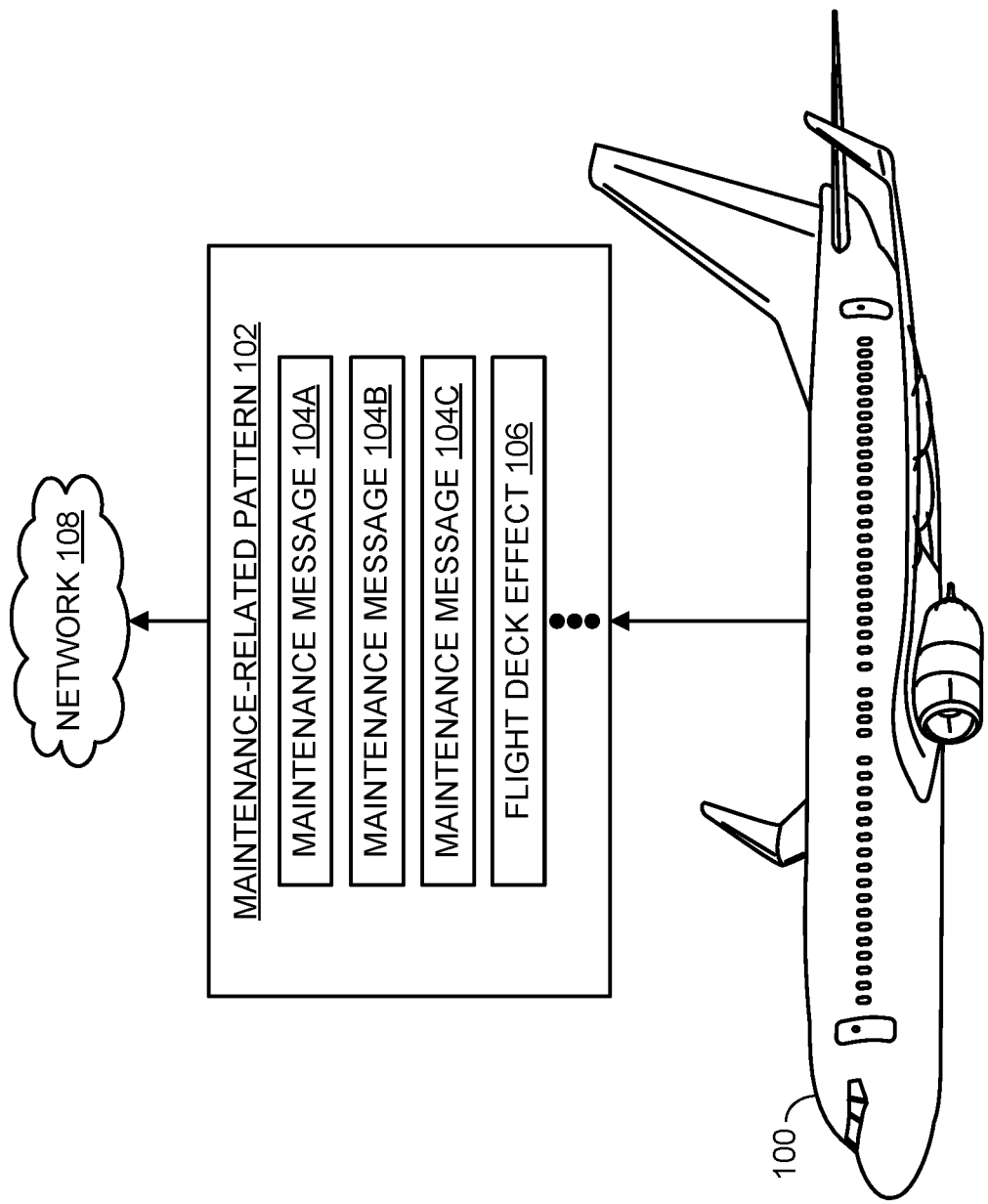
FIG. 1 schematically illustrates reporting a maintenance-related pattern observed during a flight of an aircraft.

FIG. 1 schematically illustrates detection of a maintenance-related pattern. Specifically, FIG. 1 shows a hypothetical scenario for an example aircraft 100. During a previous flight of the aircraft, a series of digital maintenance messages were reported by on-board monitoring systems in response to an unknown fault. This is schematically represented by a maintenance-related pattern 102 shown in FIG. 1, which includes several digital maintenance messages 104A, 104B, and 104C.

It will be understood that different aircraft include a wide variety of different on-board monitoring systems, each configured to monitor a wide variety of different aircraft systems, subsystems, and/or individual components for possible faults or changes in performance. As such, a "digital maintenance message" as described herein can take on a wide variety of suitable forms. In general, a digital maintenance message refers to a set of data output by an aircraft computer system that is indicative of abnormal or degraded performance of one or more aircraft systems, subsystems, and/or individual components. Such data may be organized and formatted in any suitable way, provided that the digital maintenance messages adhere to a predetermined convention—e.g., such that a reviewer of the digital maintenance messages can unambiguously interpret the messages. It will be understood that digital maintenance messages may or may not be displayed or reported to human personnel during flight of the aircraft. Digital maintenance messages are generated in response to detection of any suitable condition based on data collected from any suitable source—e.g., digital maintenance messages may be generated based on sensor output data, stored historical data, data received over a computer network, and/or data entered manually by human personnel. As one non-limiting example, a digital maintenance message may be expressed as follows: "21-66222—Zone D Air Distribution Pneumatic Duct has overheated."

In the example of FIG. 1, the maintenance-related pattern additionally includes a Flight Deck Effect (FDE) 104. In some examples, an FDE refers to any detected condition that affects the performance or safety of the aircraft and requires attention or intervention from human crew. One non-limiting example FDE may be expressed as follows: "21610341—TRIM AIR L: message (Advisory)" displayed by an on-board EICAS (Engine Indicating and Crew Alerting System). In general, a maintenance-related pattern may in some examples include any suitable number of FDEs in addition to, or instead of, digital maintenance messages. In some examples, an FDE is a sub-type of digital maintenance message.

A "maintenance-related pattern" as described herein includes a set of one or more digital maintenance messages that are reported during a flight of the aircraft (e.g., during a single flight leg from an origin airport to a destination airport). The maintenance-related pattern may be formatted in any suitable way and include any suitable information—e.g., taking the form of any suitable computer data structure. For example, in some cases, the digital maintenance messages included in the maintenance-related pattern are included in full human-readable text (e.g., Low Hydraulic Pressure), and/or are referenced by unique identifiers (e.g., maintenance message #2A287). In some examples, the maintenance-related pattern includes the specific sensor values and/or other data that caused each maintenance message to be triggered. In some examples, the maintenance-related pattern is associated with an aircraft identifier for the aircraft, a flight number for the flight (e.g., flight leg) on which the maintenance-related pattern was observed, a time/date of the flight on which the maintenance-related pattern was observed, and/or other information.

In some examples, the maintenance-related pattern includes information relating to the specific sequence in which the digital maintenance messages were output. In some examples, the maintenance-related pattern includes timestamps at which each digital maintenance message was reported, and/or some other indication of the length of time between each digital maintenance message being reported. As such, one example maintenance-related pattern specifies that a specific digital maintenance message was reported first at a specific timestamp, and then a second digital maintenance message was reported at a second timestamp, and so on.

In other examples, it will be understood that the maintenance-related pattern need not include information relating to the specific sequence of digital maintenance messages, and/or times at which the digital maintenance messages occurred. Rather, in some examples, the maintenance-related pattern is a simple list of the specific digital maintenance messages that were reported during the flight, without regard to the specific order or timing with which the digital maintenance messages were reported.

In the example of FIG. 1, the maintenance-related pattern is transmitted over a computer network 108 for analysis, as will be described in more detail below. The computer network is implemented in any suitable way, and may include one or more local and/or wide-area networks. In some examples, the computer network includes the Internet. Furthermore, the maintenance-related pattern is transmitted at any suitable time. In some examples, the maintenance-related pattern is transmitted after completion of a flight on which the pattern was observed—e.g., upon landing. In some examples, maintenance-related patterns for multiple flights are stored and then batch transmitted—e.g., upon the aircraft returning to a logistics hub, or prior to scheduled maintenance. In some examples, digital maintenance messages are transmitted to a ground-based computing system as the messages are reported in flight, and thus the overall maintenance-related pattern (e.g., set of digital maintenance messages) is generated by the ground-based system, rather than by any on-board aircraft computing systems.

It will be understood that, in some examples, the maintenance-related pattern is not transmitted over a computer network by any on-board aircraft computing systems. Rather, as another example, the current maintenance-related pattern may be written to a suitable removable data storage medium, which is then removed and physically moved to a ground-based computing system. From there, the maintenance-related pattern is analyzed by the ground-based system as part of computerized fault isolation, as will be described in more detail below, and/or transferred over a computer network to a different computing system configured to perform such analysis. Alternatively, in some cases, the maintenance-related pattern need not be transmitted or otherwise transferred off the aircraft at all. Rather, any or all of the techniques described herein may in some cases be performed partially or entirely by on-board aircraft computing systems.

Figure 2:
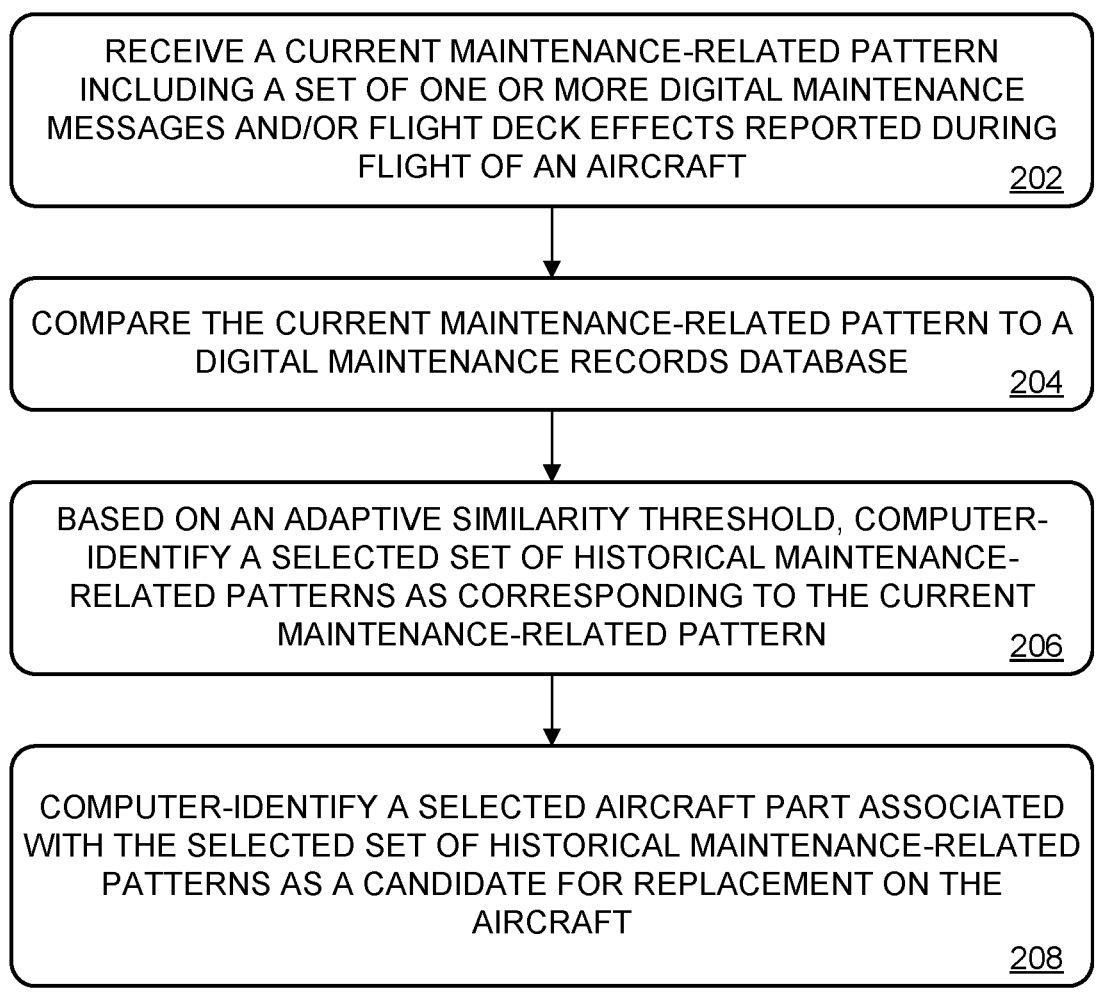
FIG. 2 illustrates an example method for computerized aircraft fault isolation.

FIG. 2 illustrates an example method 200 for computerized aircraft fault isolation. Method 200 is performed by any suitable computing system of one or more computing devices. Any computing device performing steps of method 200 may have any suitable capabilities, hardware configuration, and form factor. Steps of method 200 may be initiated, terminated, repeated, and/or looped at any suitable time and in response to any suitable condition. In some examples, method 200 is implemented by computing system 1100 described below with respect to FIG. 11.

Figures 3A, 3B:
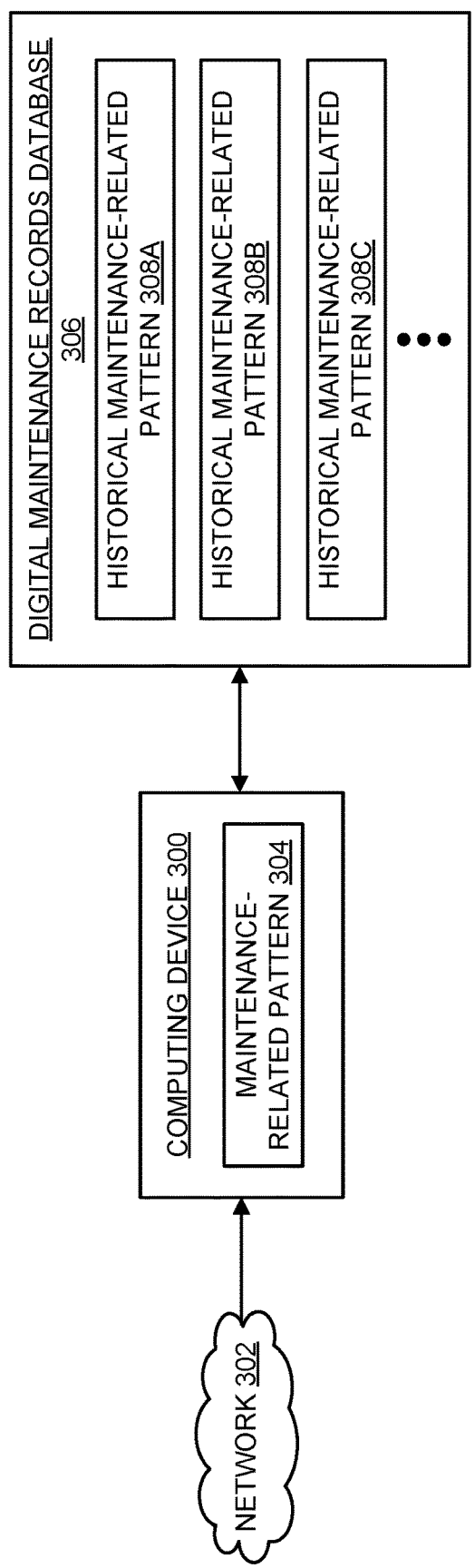
FIGS. 3A-3C schematically illustrate comparing a current maintenance-related pattern to historical maintenance-related patterns of a digital maintenance records database.

At 202, method 200 includes, at a computing device, receiving a current maintenance-related pattern that includes a set of one or more digital maintenance messages and/or FDEs reported during a flight of an aircraft. This is schematically illustrated with respect to FIG. 3A. Specifically, FIG. 3A schematically shows an example computing device 300, which is communicatively coupled to a computer network 302. Over the computer network, the computing device has received a current maintenance-related pattern 304, which includes a set of one or more digital maintenance messages reported during a flight of an aircraft. While in this example the maintenance-related pattern is received over a computer network, it will be understood that this need not be the case, as described above. Computing device 300 is implemented as any suitable ground-based and/or on-board computer, and is in some cases implemented as computing system 1100 described below with respect to FIG. 11.

Returning briefly to FIG. 2, at 204, method 200 includes comparing the current maintenance-related pattern to a digital maintenance records database. The digital maintenance records database includes a plurality of historical maintenance-related patterns observed during prior aircraft flights. This is also schematically illustrated with respect to FIG. 3A, in which computing device 300 compares the current maintenance-related pattern 304 to a digital maintenance record database 306. The database 306 includes a number of historical maintenance-related patterns observed during prior aircraft flights, three of which are shown as patterns 308A, 308B, and 308C.

The digital maintenance records database is organized and formatted in any suitable way, and is stored in any suitable location. In some examples, the digital maintenance records database is partially or entirely stored by computing device 300. In other examples, the digital maintenance records database is at least partially stored by one or more remote computing devices accessible over a computer network. For instance, in some examples, the digital maintenance records database is distributed between a plurality of servers. In some examples, data included in the digital maintenance records database is compiled from multiple sources as needed—e.g., when attempting to perform fault isolation for a particular maintenance-related pattern, different types of historical data (e.g., previous detected patterns, previous part replacements) are retrieved from multiple sources and used to construct the digital maintenance records database.

The digital maintenance records database includes any suitable number of historical maintenance-related patterns observed during prior aircraft flights, covering any suitable interval of time. In some examples, historical maintenance-related patterns in the database are limited to those reported for the same aircraft model, or the database may have any other suitable scope—e.g., aircraft models of the same family, or all aircraft models from a particular manufacturer.

New maintenance-related patterns are added to the digital maintenance records database at any suitable time and in any suitable manner. As one example, new maintenance-related patterns are added to the digital maintenance records database once they have been resolved via a successful aircraft part replacement. For example, once the airline and/or aircraft manufacturer has successfully implemented a fix that resolved maintenance-related pattern 304, it may be added to the digital maintenance records database as a historical maintenance-related pattern that includes an indication of the aircraft part that, when replaced, resolved the pattern.

In various examples, the digital maintenance records database is maintained by an airline, aircraft manufacturer, regulator, and/or any other suitable party. Similarly, any suitable parties may submit maintenance-related patterns for inclusion in the database, and/or compare current maintenance-related patterns to historical patterns in the database. In some examples, access to use the database is selectively limited via any suitable credentialling scheme.

FIG. 3B shows a representation of current maintenance-related pattern 304 in more detail. It will be understood that the specific information included in pattern 304, and the manner in which such information is represented and formatted, is non-limiting and provided only for the sake of explanation. Particularly, it will be understood that the tail number and maintenance messages shown in FIG. 3B are non-limiting examples, and should not be construed as corresponding to any real aircraft or real digital maintenance messages output by any particular aircraft. As discussed above, maintenance-related patterns as described herein include any suitable data, and are organized and formatted in any suitable manner.

In FIG. 3B, pattern 304 includes indications of three different digital maintenance messages that were output by on-board monitoring systems during a flight of an aircraft. Additionally, pattern 304 includes an indication 310 of the tail number of the aircraft on which the maintenance-related pattern was detected, and an indication 312 of the date and time of the flight leg on which the maintenance-related pattern was detected.

Figure 3C:
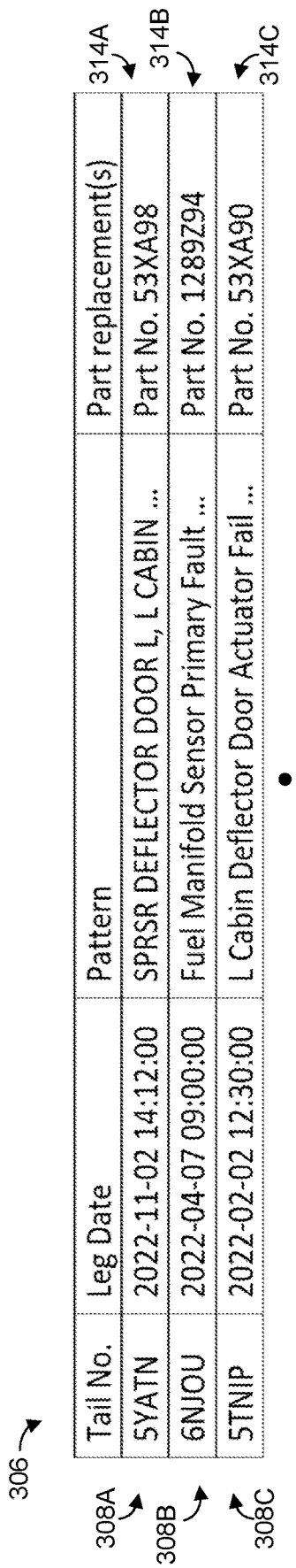

FIG. 3C shows a representation of the digital maintenance records database 306 in more detail, including historical maintenance-related patterns 308A, 308B, and 308C. As with maintenance-related pattern 304 shown in FIG. 3B, it will be understood that the specific information included in database 306, and the manner in which such information is represented and formatted, is non-limiting and provided only for the sake of explanation. In particular, it will be understood that the aircraft part numbers included in FIG. 3C are used as example placeholders, and should not be construed as corresponding to any real aircraft parts.

As shown, each of the historical maintenance-related patterns in the database include substantially similar information to current maintenance-related pattern 304—e.g., each pattern includes an indication of the digital maintenance messages comprising the pattern, a tail number indication, and a flight leg time/date indication. In some examples, the plurality of historical maintenance-related patterns each have a same digital data format as the current maintenance-related pattern to which they are compared—e.g., they include similar data fields, and the indications of the digital maintenance messages in each pattern are expressed in the same manner. This beneficially facilitates computerized comparison between the current maintenance-related pattern and the historical maintenance-related pattern—e.g., computer database comparison tools can directly compare the current pattern to the historical patterns without requiring prior data conversion steps thus enabling robust and quickly-executed comparisons over huge datasets in a manner that is not feasible without computer assistance.

Additionally, in FIG. 3C, each historical maintenance-related pattern is associated with a corresponding indication of one or more aircraft parts that, when replaced, resolved an underlying fault corresponding to the historical maintenance-related pattern. Specifically, each of historical maintenance-related patterns 308A-308C are associated with corresponding part indications 314A-314C. It will be understood that each entry in the digital maintenance records database includes any suitable information in addition to, or instead of, that which is explicitly described herein. As additional non-limiting examples, records in the digital maintenance records database may specify weather conditions for the flight, a total weight of the flight, number of passengers aboard the flight, origin and/or destination locations, pilot/crew identities, etc.

In some examples, the same maintenance-related pattern may reoccur on multiple flights of the same or different aircraft. As such, in some examples, the same maintenance-related pattern may be present multiple times in the digital maintenance records database. Depending on how the database is formatted, this may be expressed as multiple different database entries (e.g., each associated with respective tail numbers and flight leg times), or as a single entry that includes an indication of how many times the pattern has been observed during previous flights. In cases where the same maintenance-related pattern is observed multiple times, the pattern may be associated with indications of multiple different aircraft parts that, when replaced, were determined to have resolved the maintenance-related pattern. As will be described in more detail below, such information is in some cases considered when identifying a candidate aircraft part for replacement.

The current maintenance-related pattern is compared to the digital maintenance records database in any suitable way. As will be described in more detail below, a suitable similarity comparison operation is in some cases used to express the relative similarity between the current maintenance-related pattern and any or all of the historical maintenance-related patterns in the database. As non-limiting examples, the similarity comparison operation includes computing the Jaccard or cosine similarity between the current maintenance-related pattern and any or all of the historical maintenance-related patterns. In other words, the similarity comparison operation attempts to quantify the extent to which the set of digital maintenance messages in the current maintenance-related pattern overlaps with the set of digital maintenance messages in each historical maintenance-related pattern. Relatively more overlap (e.g., having more digital maintenance messages in common) results in a higher similarity score. A relatively higher similarity score between any two maintenance-related patterns is associated with an increased likelihood that the two patterns stem from the same underlying fault, and therefore, that the documented fix for the historical maintenance-related pattern is relatively more likely to be applicable to the current maintenance-related pattern.

In one non-limiting example, calculating the Jaccard similarity includes determining the size of the intersection of two datasets, divided by the size of the union of the datasets. In one approach, each maintenance-related pattern is parsed as a set of unique elements (e.g., digital maintenance messages) represented by different values—e.g., each digital maintenance message corresponds to a different value. The Jaccard similarity J between a current maintenance-related pattern C and a historical maintenance-related pattern H can be given by:

$$J(C, H) = \frac{|C \cap H|}{|C \cup H|}$$

In another non-limiting example, calculating the cosine similarity includes expressing each maintenance-related pattern as a multi-dimensional vector, where the values of the vector in each dimension correspond to the digital maintenance messages of the maintenance-related pattern—e.g., each digital maintenance message is associated with a different unique value as described above. The cosine similarity between the current maintenance-related pattern and historical maintenance-related pattern can then be found via a geometric comparison of the two vectors—e.g., by finding the dot product of the vectors, and dividing the dot product by the product of the length of the vectors.

Returning briefly to FIG. 2, at 206, method 200 includes, based on an adaptive similarity threshold, computer-identifying a selected set of historical maintenance-related patterns from the digital maintenance records database as corresponding to the current maintenance-related pattern. Specifically, the selected set of historical maintenance-related patterns include one or more historical maintenance-related patterns determined as being most similar to the current maintenance-related pattern, according to an adaptive similarity threshold as will be described in more detail below.

Figure 4:
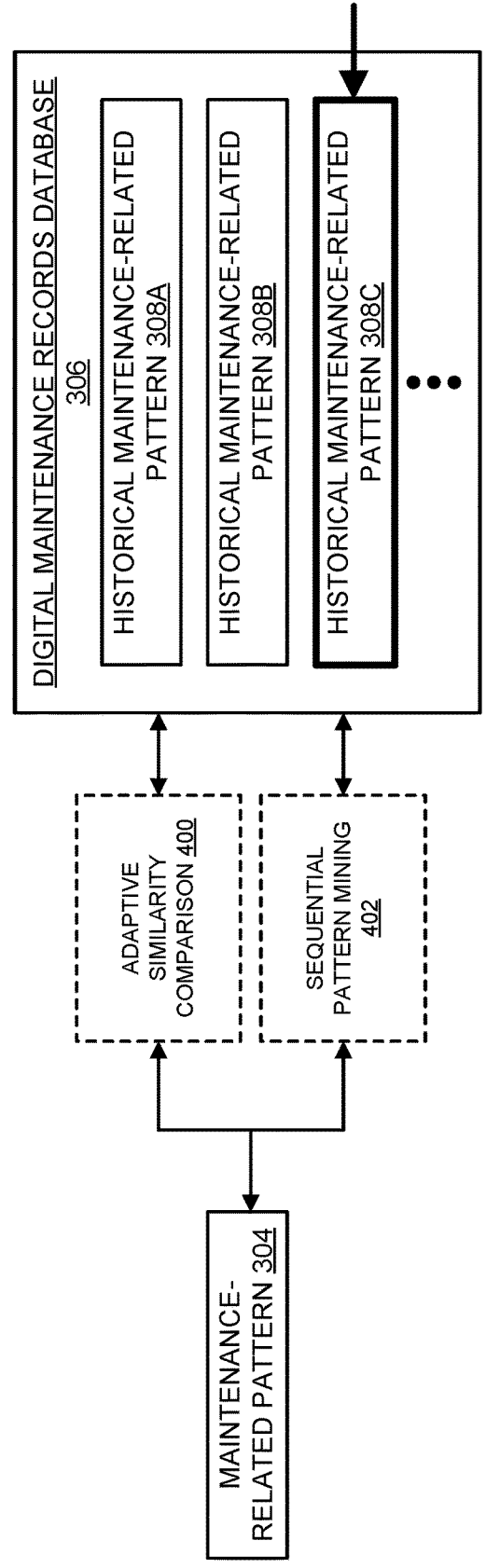
FIG. 4 schematically illustrates computer identifying a selected set of historical maintenance-related patterns based on an adaptive similarity threshold.

This is schematically illustrated with respect to FIG. 4, again showing current maintenance-related pattern 304 and digital maintenance records database 306. As shown, the current maintenance-related pattern is compared to the historical maintenance-related patterns in an adaptive similarity comparison 400. As a result, historical maintenance-related pattern 308C is selected as corresponding to the current maintenance-related pattern based on a computed similarity between the two patterns (e.g., a Jaccard or cosine similarity).

In some examples, due to the wide variety of aircraft systems and associated maintenance messages, it may not be feasible or useful to compare a particular maintenance-related pattern to every historical maintenance-related pattern in the digital maintenance records database. Rather, in some examples, the current maintenance-related pattern is only compared to historical maintenance-related patterns associated with a same ATA (Air Transport Association) chapter as the current maintenance-related pattern.

The present disclosure primarily focuses on similarity comparisons that do not consider the specific sequence in which the digital maintenance messages were output. For example, the approach described above considers the extent to which a current maintenance-related pattern and a historical maintenance-related pattern have overlapping sets of digital maintenance messages, in a manner that is agnostic as to the order in which the digital maintenance messages occurred within each pattern. This may be referred to as "horizontal correlation."

However, in some examples, the selected set of historical maintenance-related patterns is further identified based at least on performing sequential pattern mining to identify historical maintenance-related patterns of the digital maintenance records database having higher than a threshold sequence similarity to the current maintenance-related pattern, where any suitable threshold is used depending on the implementation and depending on the specific pattern mining algorithm used. This may be referred to as "vertical correlation." As such, in FIG. 4, the current maintenance-related pattern 304 is additionally compared to the digital maintenance records database via sequential pattern mining 402. Any suitable sequential pattern mining algorithm may be used, depending on the implementation.

In general, sequential pattern mining refers to quantifying the extent to which the sequence of digital maintenance messages in the current maintenance-related pattern matches the sequence of digital maintenance messages in historical maintenance-related patterns. Historical patterns having relatively higher sequence similarity to the current maintenance-related pattern are in some cases relatively more likely to stem from the same underlying fault, and as such, a documented part replacement associated with the historical maintenance-related pattern may have a higher likelihood of also resolving the current maintenance-related pattern.

Figure 5:
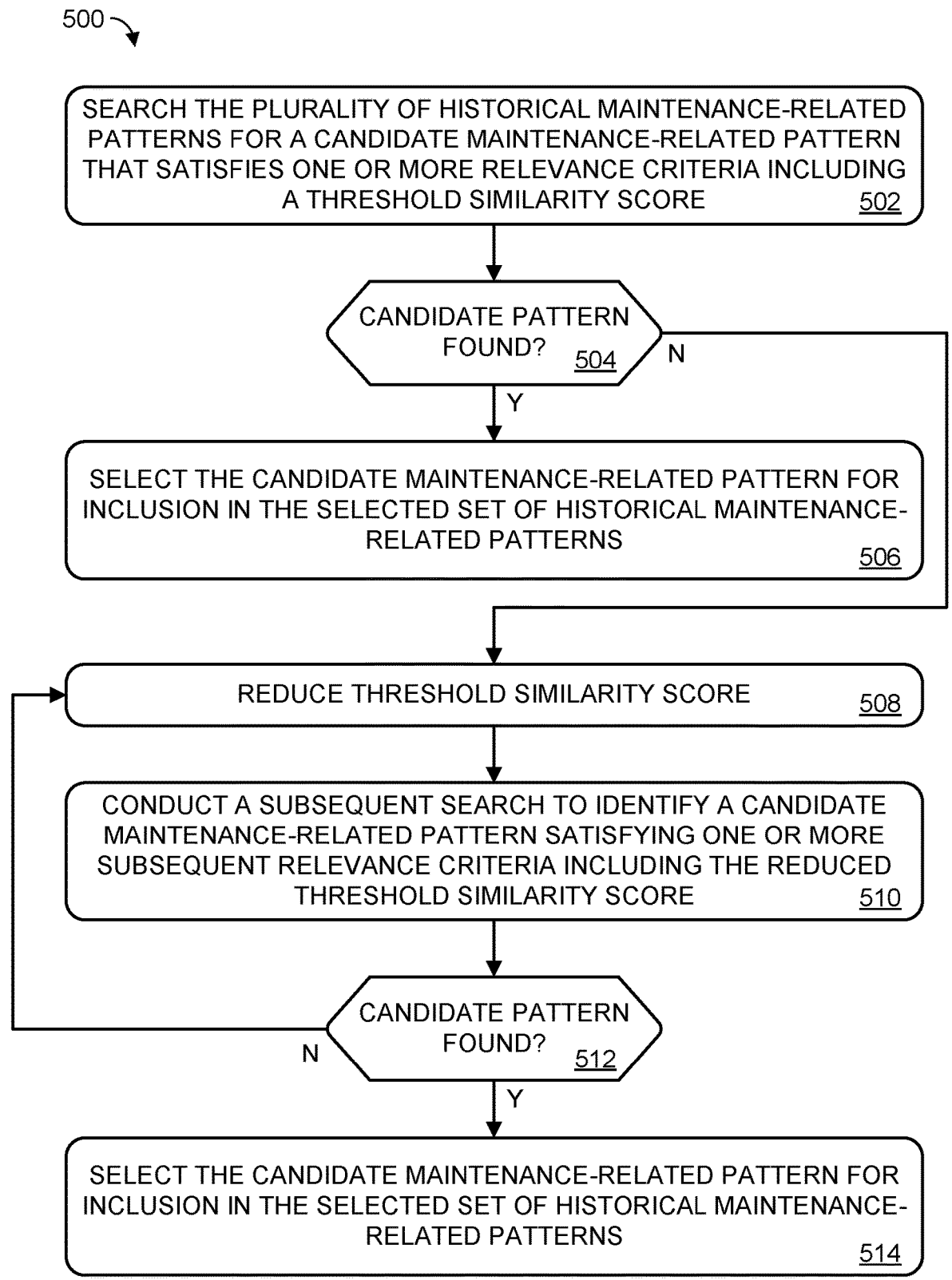
FIG. 5 illustrates an example method for searching a digital maintenance records database for a candidate maintenance-related pattern.

FIG. 5 illustrates one non-limiting example method 500 for computer-identifying selected historical maintenance-related patterns based on an adaptive similarity threshold. As with method 200, method 500 is performed by any suitable computing system of one or more computing devices. Any computing device performing steps of method 500 may have any suitable capabilities, hardware configuration, and form factor. Steps of method 500 may be initiated, terminated, repeated, and/or looped at any suitable time and in response to any suitable condition. In some examples, method 500 is implemented by computing system 1100 described below with respect to FIG. 11.

At 502, method 500 includes searching the plurality of historical maintenance-related patterns for a candidate maintenance-related pattern that satisfies one or more relevance criteria. As one example, the one or more relevance criteria include a similarity score relative to the current maintenance-related pattern that exceeds a threshold similarity score. As one example, the similarity score is calculated by computing a Jaccard similarity between the current maintenance-related pattern and the candidate maintenance-related pattern. One non-limiting example of a threshold similarity score is 95%, which indicates that two patterns are highly similar, with some room to accommodate possible maintenance messages that are superfluous or unrelated to the underlying maintenance problem.

Upon identifying a historical maintenance-related pattern that satisfies the threshold similarity score, additional relevance criteria are in some cases checked prior to selecting the historical maintenance-related pattern as corresponding to the current maintenance-related pattern. In some examples, the relevance criteria further include determining whether the historical maintenance-related pattern has reoccurred multiple times in the historical maintenance records database. If so, the computing system determines whether a same aircraft part is indicated as having resolved the maintenance-related pattern at least a threshold number of times—e.g., two or more. In other words, in some cases, the one or more relevance criteria further include association with a corresponding aircraft part that has at least a threshold number of prior documented replacements for the candidate maintenance-related pattern.

Furthermore, in some examples, the computing system calculates a fault-resolution likelihood for the aircraft part associated with the candidate maintenance-related pattern, and the relevance criteria include determining whether the fault resolution likelihood for satisfies a threshold fault-resolution likelihood. This is done by comparing the number of documented replacements for a particular aircraft part associated with the candidate maintenance-related pattern, to the number of documented replacements for all other aircraft parts associated with the candidate maintenance-related pattern. In cases where only one aircraft part is documented as having resolved the candidate maintenance-related pattern, then the fault-resolution likelihood will be 100%. However, in cases where multiple different aircraft parts are documented as having resolved prior instances of the maintenance-related pattern, then the fault-resolution likelihood for a particular aircraft part will depend on its share of the total documented replacements for the maintenance-related pattern. For example, if a particular historical maintenance-related pattern is associated with 10 documented replacements, 9 of which are for a first aircraft part and 1 of which is for a second aircraft part, then the first aircraft part would have a 90% fault-resolution likelihood. One non-limiting example of a suitable threshold fault-resolution likelihood is 55%.

Continuing with method 500, at 504, the method includes determining whether any candidate maintenance-related patterns are identified that satisfy the one or more relevance criteria. If yes, method 500 proceeds to 506, where the candidate maintenance-related pattern is selected for inclusion in the selected set of historical maintenance-related patterns corresponding to the current maintenance-related pattern.

If, at 504, it is determined that no historical maintenance-related patterns in the digital maintenance records database satisfy the one or more relevance criteria, method 500 proceeds to 508, where the threshold similarity score is reduced to give a subsequent threshold similarity score prior to a subsequent search. At 510, method 500 includes conducting a subsequent search to identify a candidate maintenance-related pattern satisfying one or more subsequent relevance criteria, which includes the subsequent threshold similarity score. In other words, upon failing to identify any candidate maintenance-related patterns satisfying the one or more relevance criteria, the computing system searches the database again, this time searching for historical maintenance-related patterns that are less similar to the current maintenance-related pattern.

At 512, if a candidate maintenance-related pattern is identified that satisfies the subsequent relevance criteria, method 500 proceeds to 514, where the identified pattern is selected for inclusion in the selected set of historical maintenance-related patterns. If, however, the subsequent search does not identify any candidate maintenance-related patterns satisfying the subsequent relevance criteria, method 500 returns to 508, where the threshold similarity score is again reduced prior to another subsequent search.

In other words, in some examples, multiple subsequent searches are conducted, and the threshold similarity score is iteratively reduced for each subsequent search. In this manner, after each search of the digital maintenance records database that does not return a candidate maintenance-related pattern satisfying the applicable relevance criteria, the threshold similarity score is reduced, and another search is conducted. As one non-limiting example, the threshold similarity score is reduced by 5% for each subsequent search—e.g., the first search of the digital maintenance records database uses a 95% similarity threshold, the second search of the digital maintenance records database uses a 90% similarity threshold, and so on.

In some examples, in addition to the subsequent threshold similarity score, the one or more subsequent relevance criteria further include association with a corresponding aircraft part that has at least a subsequent threshold number of prior documented replacements for the candidate maintenance-related pattern, and has at least a subsequent threshold fault-resolution likelihood based on the prior documented replacements. These values—the subsequent threshold number of prior documented replacements and the subsequent threshold fault-resolution likelihood—may or may not be the same values as those described above for the first search of the digital maintenance records database.

In some examples, either or both of the subsequent threshold number of prior documented replacements and the subsequent threshold fault-resolution likelihood are increased for the subsequent searches. For instance, because the subsequent searches are attempting to identify historical patterns that have less overall similarity to the current maintenance-related pattern, it may be desirable to be more selective regarding the overall strength of the historical patterns that are considered, where patterns are considered to be "stronger" if they are associated with aircraft parts having high numbers of documented replacements, and/or high fault-resolution likelihoods. As non-limiting examples, the subsequent threshold number of prior documented replacements may be 5 or more documented replacements, and the subsequent threshold fault-resolution likelihood may be 80%.

In some examples, the one or more subsequent searches continue until a candidate maintenance-related pattern is identified that satisfies the one or more subsequent relevance criteria, or the subsequent threshold similarity score is reduced to a minimum threshold similarity score. As one example, the minimum threshold similarity score is 40%—e.g., continuing to reduce the threshold similarity score beyond this point would likely not result in identifying any historical maintenance-related patterns that are relevant to the current maintenance-related pattern. Depending on the implementation, any suitable number of subsequent searches of the digital maintenance records database may be conducted.

In any case, by comparing the current maintenance-related pattern to the digital maintenance records database based on an adaptive similarity threshold, the computing system identifies a set of one or more selected historical maintenance-related patterns as corresponding to the current maintenance-related pattern. In some cases, the set of one or more selected historical maintenance-related patterns may include any historical maintenance-related patterns that satisfy the one or more relevance criteria during a first search of the digital maintenance records database, or satisfied the same subsequent relevance criteria during a subsequent search. In other cases, only a fixed number of historical maintenance-related patterns are selected, regardless of how many historical maintenance-related patterns satisfied the relevance criteria—e.g., only the three most relevant patterns are selected. In some examples, only a single historical pattern is selected, regardless of how many historical patterns satisfied the one or more relevance criteria.

As described above, each selected historical maintenance-related pattern is associated with indications of one or more aircraft parts that, when replaced, resolved an underlying fault corresponding to the historical maintenance-related pattern. Furthermore, in some cases, the computing system determines a number of prior documented replacements for each aircraft part associated with the selected historical maintenance-related pattern, and a fault-resolution likelihood for each aircraft part associated with the selected historical maintenance-related pattern.

This is schematically illustrated with respect to FIG. 6, which represents a selected historical maintenance-related pattern 600. Selected pattern 600 may be one of a group of historical maintenance-related patterns selected as corresponding to the current maintenance-related pattern. As shown, the selected pattern 600 is associated with two indications 602A and 602B of aircraft parts previously documented as having resolved prior instances of the maintenance-related pattern upon replacement. Each of these aircraft parts is associated with a number of prior documented replacements 604A/604B, and a fault-resolution likelihood 606A/606B.

Returning briefly to FIG. 2, at 208, method 200 includes computer-identifying a selected aircraft part associated with the selected set of historical maintenance-related patterns as a candidate for replacement on the aircraft. In some examples, the selected aircraft part is the aircraft part associated with the highest-similarity historical maintenance-related pattern, and having a highest fault-resolution likelihood of the aircraft parts associated with the highest-similarity historical maintenance-related pattern. In other examples, however, the selected aircraft part is chosen in another suitable way—e.g., an aircraft part associated with a relatively less similar historical maintenance-related pattern may be selected if it has a relatively higher fault-resolution likelihood and number of prior documented replacements. In some cases, multiple aircraft parts may be selected as candidates for replacement—e.g., the computing system may output an ordered set of the top-k aircraft parts as potential replacement candidates, and provide statistics (e.g., number of documented replacements, fault-resolution likelihood) for each part.

The present disclosure has thus far focused primarily on identifying candidate aircraft parts on the basis of digital maintenance-related patterns, which include digital maintenance messages. In some examples, however, aircraft parts may additionally or alternatively be selected as candidates for replacement on the basis of digital sensor-related patterns, which include digital sensor values reported by aircraft sensors.

Accordingly, FIG. 7 illustrates another example method 700 for computerized aircraft fault isolation, which considers sensor-related patterns instead of maintenance-related patterns. As with method 200, method 700 is performed by any suitable computing system of one or more computing devices. Any computing device performing steps of method 700 may have any suitable capabilities, hardware configuration, and form factor. Steps of method 700 may be initiated, terminated, repeated, and/or looped at any suitable time and in response to any suitable condition. In some examples, method 700 is implemented by computing system 1100 described below with respect to FIG. 11.

At 702, method 700 includes receiving a current sensor-related pattern that includes a set of one or more digital sensor values reported during a flight of an aircraft. In some examples, the set of digital sensor values of the current sensor-related pattern are limited to those sensor values that exceed a historical nominal range for their corresponding sensor type, rather than all sensor values reported during the flight. In other words, over a number of flights of a particular aircraft model, nominal sensor ranges for each sensor type can be identified. On future flights, any sensor values that fall outside their nominal range (e.g., by more than two standard deviations, or another suitable threshold) may be reported as part of a sensor-related pattern, for the purpose of computerized fault isolation. The nominal ranges for each sensor type may be based on any suitable number of previous flights—as one example, sensor values may be selected from the steady state cruise flight phases of 40 previous flights in determining each sensor type's nominal range.

The description of FIG. 7 focuses on "sensor-related patterns" as being distinct from the "maintenance-related patterns" described above. However, it will be understood that this need not be the case. Rather, in some examples, any or all of the information described herein as being included in a "sensor-related pattern" may additionally or alternatively be included in a "maintenance-related pattern" as described above, and thus any or all of the operations described with respect to FIG. 7 may be applied to maintenance-related patterns. In other examples, however, maintenance-related patterns and sensor-related patterns are distinct data structures, and a particular aircraft may generate either or both of a maintenance-related pattern and a sensor-related pattern during a particular flight.

As with the maintenance-related patterns described above, a sensor-related pattern includes any suitable information, and is organized and formatted in any suitable way—e.g., as any suitable computer data structure. A sensor-related pattern will typically include identifiers of the sensors that output the abnormal sensor values, and/or indications of the types of sensor data within the patten—e.g., temperature data, pressure data, or electrical data. In some examples, the sensor-related pattern further includes the actual sensor values, and/or indications of the magnitude of each sensor value's deviation from its nominal range. It will be understood that aircraft include large numbers of different sensors, each configured to collect a wide range of different types of data, and as such, a wide range of suitable information may be included in each sensor-related pattern. In some examples, the sensor-related pattern is associated with an aircraft identifier for the aircraft, a flight number for the flight (e.g., flight leg) on which the sensor-related pattern was observed, and/or a date/time of the flight on which the sensor-related pattern was observed.

As with the maintenance-related patterns, a sensor-related pattern is in some cases transmitted by on-board aircraft computing systems over a computer network for analysis by ground-based systems. Additionally, or alternatively, sensor-related patterns may be transferred to ground-based systems in another suitable way (e.g., via removable data storage media), and/or the on-board aircraft computing systems may be configured to analyze the sensor-related patterns to perform fault isolation. In cases where the sensor-related patterns are sent to ground-based systems for analysis, such sending may occur at any suitable time—e.g., when the aircraft lands after the flight on which the sensor-related pattern was detected, prior to scheduled maintenance, and/or transmitted from the air as the sensor values are output.

Figure 8:
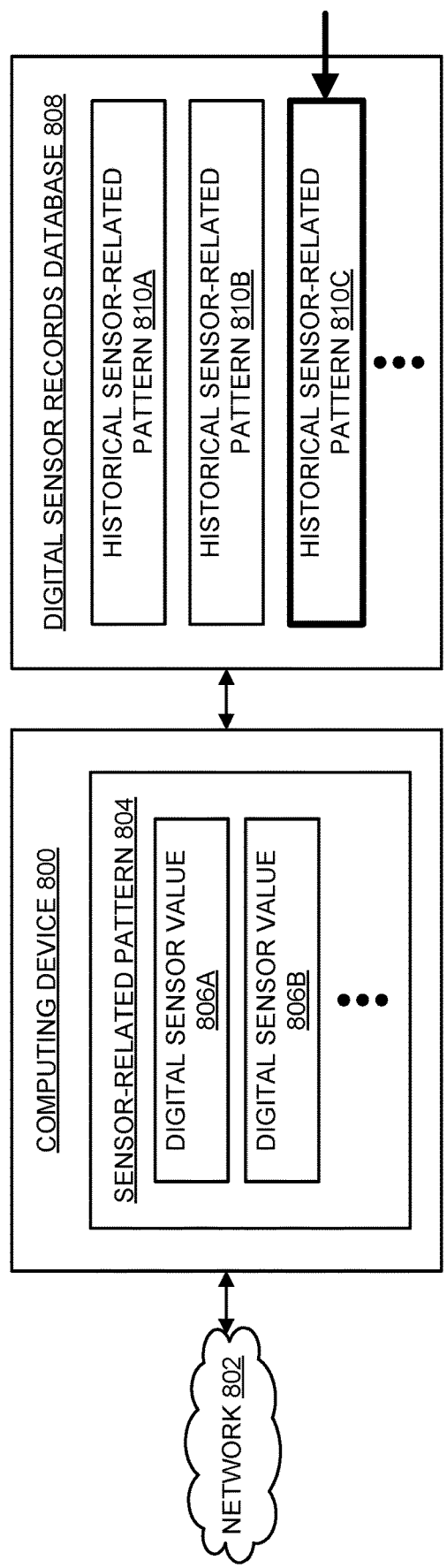
FIG. 8 schematically illustrates comparing a current sensor-related pattern to a digital sensor records database.

This is schematically illustrated with respect to FIG. 8, showing an example computing device 800 communicatively coupled to a computer network 802. Computing device 800 has received a sensor-related pattern 804, which includes digital sensor values 806A and 806B. As discussed above, in some cases, these include the actual sensor values output by digital sensors on-board the aircraft. In other examples, however, the sensor-related pattern may specify the type of sensor value that exceeded its nominal value (e.g., a particular temperature sensor), without including the actual value output by the sensor.

Returning briefly to FIG. 7, at 704, method 700 includes comparing the current sensor-related pattern to a digital sensor records data base that includes a plurality of historical sensor-related patterns observed during prior aircraft flights. At 706, method 700 includes computer-identifying a selected set of historical sensor-related patterns from the digital sensor records database as corresponding to the current sensor-related pattern. This is also schematically illustrated with respect to FIG. 8, in which sensor-related pattern 804 is compared to a digital sensor records database. The digital sensor records database includes a plurality of historical sensor-related patterns, three of which are shown as historical patterns 810A, 810B, and 810C. In the example of FIG. 8, historical sensor-related pattern 810C has been identified as corresponding to the current sensor-related pattern.

As with the digital maintenance records database, the digital sensor records database includes any suitable information, and is organized and formatted in any suitable way. The digital sensor records database may be distributed between any suitable number of different computing devices, and may be maintained and used by any suitable parties. In some examples, any or all of the information described as being included in the digital sensor records database may be included in a digital maintenance records database as described above.

Furthermore, the current sensor-related pattern is compared to the historical sensor-related patterns in any suitable way, and may be done substantially as described above with respect to comparing maintenance-related patterns. For instance, a Jaccard or cosine similarity may be calculated to determine the extent to which the sensor data included in the current sensor-related pattern overlaps with sensor data in historical sensor-related patterns. Additionally, or alternatively, sequential pattern mining may be used to identify historical sensor-related patterns in which the sequential order of abnormal sensor readings is relatively more similar to the current sensor-related pattern.

Furthermore, due to the wide variety of different sensors on board an aircraft, it may not be feasible or useful to compare the current sensor-related pattern to every historical sensor-related pattern in the digital sensor records database. Rather, in some examples, the current sensor-related pattern is compared only to historical sensor-related patterns of the digital sensor records database associated with a same ATA chapter as the current sensor-related pattern.

In some examples, the selected sensor-related pattern is identified based on an adaptive similarity threshold, as described above. In other words, the method of FIG. 5 may in some examples be used for identifying candidate sensor-related patterns in addition to, or instead of, identifying candidate maintenance-related patterns. Specifically, the computing system may conduct a first search of the digital sensor records database to identify any historical sensor-related patterns satisfying one or more relevance criteria (e.g., a first threshold similarity score). If necessary, one or more subsequent searches may be conducted using subsequent relevance criteria (e.g., a subsequent threshold similarity score that is iteratively reduced for each subsequent search).

Returning briefly to FIG. 7, at 708, method 700 includes computer-identifying a selected aircraft part associated with the selected set of historical sensor-related patterns in the digital sensor records database as a candidate for replacement on the aircraft to address the current sensor-related pattern. As with the process described above for maintenance-related patterns, any suitable criteria may be used for selecting a particular aircraft part as a candidate for replacement. As one example, the selected aircraft part is associated with a highest-similarity historical sensor-related pattern (e.g., given by computing the Jaccard similarity with the current sensor-related pattern), and has a highest fault-resolution likelihood of the aircraft parts associated with the highest-similarity historical sensor-related pattern.

In some examples, the process described with respect to FIG. 7 is performed independently of the process described with respect to FIG. 2. In other words, the computing system identifies two or more different aircraft parts as candidates for replacement, including a first aircraft part selected based on comparison of maintenance-related patterns, and a second aircraft part selected based on comparison of sensor-related patterns. Either or both of these aircraft parts may be recommended for potential replacement.

In one example, the computing system outputs a part replacement recommendation that recommends replacement of either the first selected aircraft part (e.g., identified via comparison of maintenance-related patterns) or the second selected aircraft part (e.g., identified via comparison of sensor-related patterns), based on whichever of the first selected aircraft part or the second selected aircraft part has a higher fault-resolution likelihood—e.g., as compared to other aircraft parts associated with the selected set of historical maintenance-related patterns or the selected set of historical sensor-related patterns. For example, if the first selected aircraft part has a fault-resolution likelihood of 96% when compared to other aircraft parts documented as having been replaced for the same maintenance-related pattern, and the second selected aircraft part has a fault-resolution likelihood of 87% when compared to other aircraft parts documented as having been replaced for the same sensor-related pattern, then the first selected aircraft part is recommended for potential replacement. Alternatively, both aircraft parts may be recommended as potential replacement candidates, and/or any other suitable criteria may be used in evaluating whether a particular aircraft part should be recommended for replacement.

Figure 9:
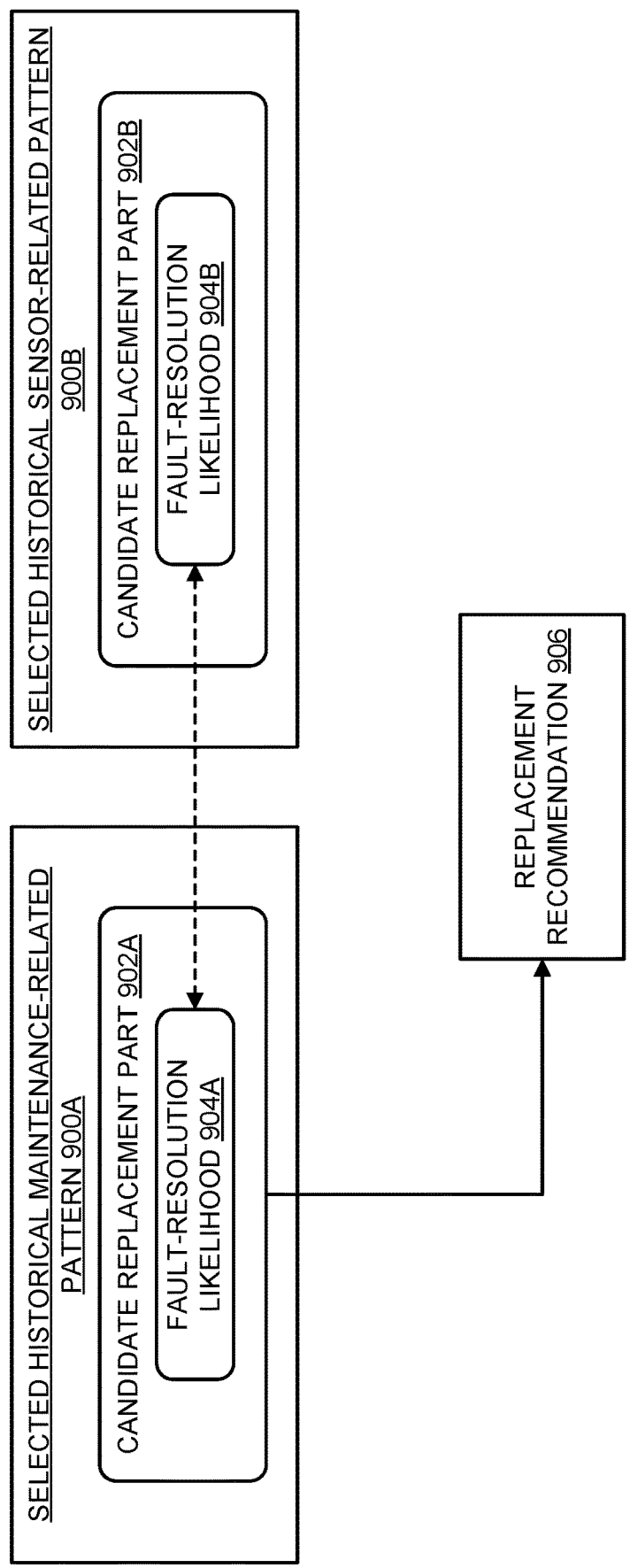
FIG. 9 schematically illustrates computer-identifying a selected aircraft part as a candidate for replacement.

This is schematically illustrated with respect to FIG. 9, representing a selected historical maintenance-related pattern 900A, and a selected historical sensor-related pattern 900B. Each of these is associated with respective candidate replacement parts 902A and 902B, and each candidate replacement part has a respective fault-resolution likelihood 904A and 904B. In the example of FIG. 9, the fault-resolution likelihood for candidate replacement part 902A is higher than the fault-resolution likelihood for candidate replacement part 902B. As such, the computing system outputs a part replacement recommendation 906 that specifies candidate replacement part 902B.

Figure 10:
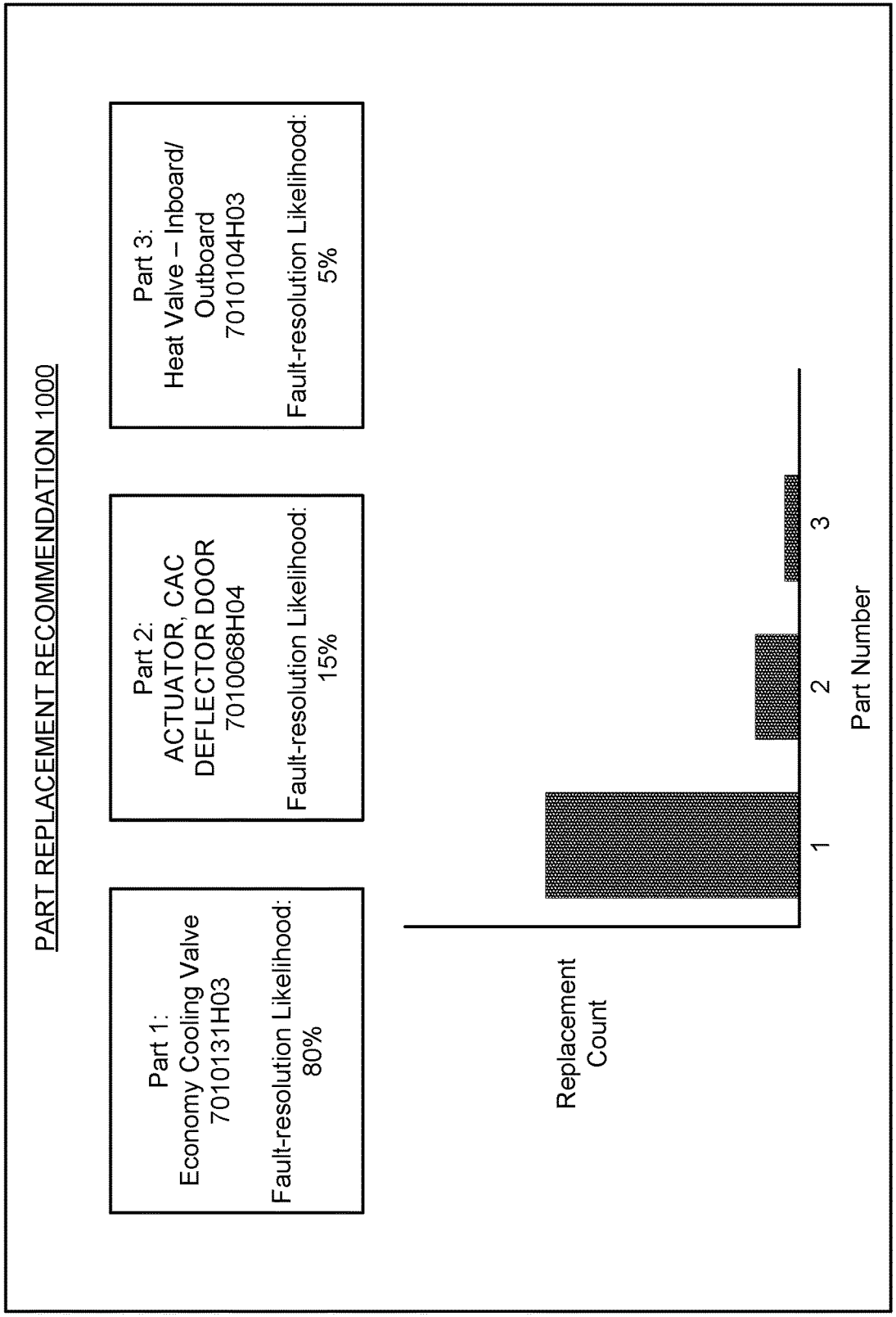
FIG. 10 depicts an example aircraft part replacement recommendation.

FIG. 10 depicts a simplified and non-limiting example of a part replacement recommendation 1000 output by a computing system after performing any or all of the steps described above. In this non-limiting example, the part replacement recommendation provides details for three different aircraft parts, identified as described above—e.g., via either or both of comparison of a current maintenance-related pattern to historical maintenance-related patterns, and comparison of a current sensor-related pattern to historical sensor-related patterns. In other examples, other suitable numbers of aircraft parts may be included in the part replacement recommendation—e.g., the top-k aircraft parts according to fault-resolution likelihood, identified via either or both of the maintenance-related process and the sensor-related process. In some examples, only one aircraft part is listed as a candidate for potential replacement.

In FIG. 10, the part replacement recommendation provides fault-resolution likelihoods for each listed part, as well as a chart indicating the total number of documented replacements for each listed part. Such data beneficially provides human reviewers with useful information in evaluating which aircraft part(s) should ultimately be replaced in attempting to resolve a current observed maintenance issue.

It will be understood that the techniques described herein are useable to provide other analytics and/or recommendations in addition to, or instead of, part replacement recommendations. In some examples, the techniques described herein may be useable to provide predictions of future patterns likely to occur after the current pattern. For example, the computing system may search the historical maintenance-related patterns and/or sensor-related patterns to identify sequential trends, in which one or more subsequent patterns are observed as typically occurring after the current pattern. In some examples, the computing system generates and outputs a list of such predicted future patterns—e.g., to enable human users to predict which aircraft components are likely to fail next.

Additionally, or alternatively, the computing system may output data useable to perform sensitivity analysis. Specifically, for a particular aircraft part, the computing system may search the historical maintenance records database and/or sensor records database to determine which historical patterns are associated with replacement of the specified part, and output a list of such historical patterns. This can be useful in evaluating the impact on the overall aircraft caused by failure of a specific component—e.g., to determine if a specific part is frequently contributing to aircraft faults.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 11:
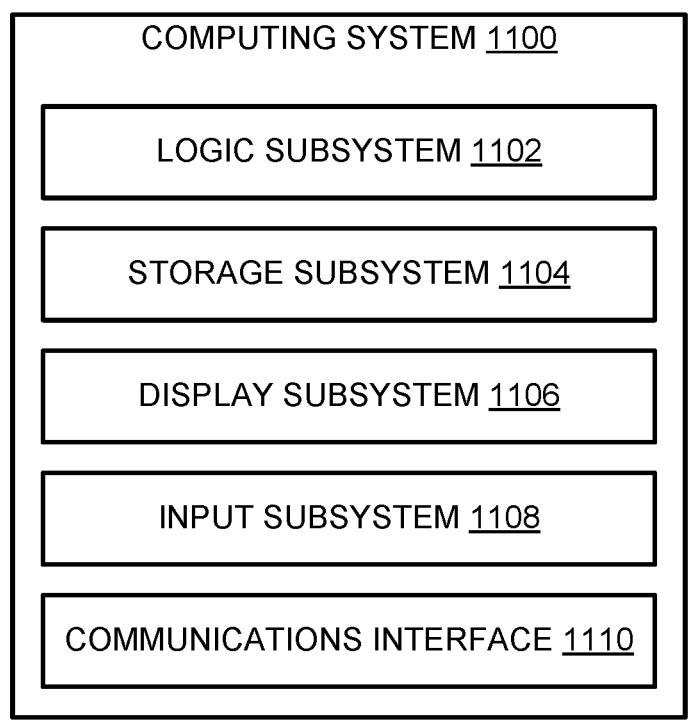
FIG. 11 schematically shows an example computing system.

FIG. 11 schematically shows a simplified representation of a computing system 1100 configured to provide any to all of the compute functionality described herein. Computing system 1100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1100 includes a logic subsystem 1102 and a storage subsystem 1104. Computing system 1100 may optionally include a display subsystem 1106, input subsystem 1108, communication subsystem 1110, and/or other subsystems not shown in FIG. 11.

Logic subsystem 1102 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1104 includes one or more physical devices configured to temporarily and/or permanently hold computer information such as data and instructions executable by the logic subsystem. When the storage subsystem includes two or more devices, the devices may be collocated and/or remotely located. Storage subsystem 1104 may include volatile, nonvolatile, dynamic, static, read/write, read-only, random-access, sequential-access, location-addressable, file-addressable, and/or content-addressable devices. Storage subsystem 1104 may include removable and/or built-in devices. When the logic subsystem executes instructions, the state of storage subsystem 1104 may be transformed—e.g., to hold different data.

Aspects of logic subsystem 1102 and storage subsystem 1104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1106 may be used to present a visual representation of data held by storage subsystem 1104. This visual representation may take the form of a graphical user interface (GUI). Display subsystem 1106 may include one or more display devices utilizing virtually any type of technology. In some implementations, display subsystem may include one or more virtual-, augmented-, or mixed reality displays.

When included, input subsystem 1108 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1110 may be configured to communicatively couple computing system 1100 with one or more other computing devices. Communication subsystem 1110 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for computerized aircraft fault isolation comprises: at a computing device, receiving a current maintenance-related pattern, the current maintenance-related pattern including a set of one or more digital maintenance messages reported during a flight of an aircraft; comparing the current maintenance-related pattern to a digital maintenance records database, the digital maintenance records database including a plurality of historical maintenance-related patterns observed during prior aircraft flights, the plurality of historical maintenance-related patterns each having a same digital data format as the current maintenance-related pattern, and each historical maintenance-related pattern associated with an indication of one or more aircraft parts that, when replaced, resolved an underlying fault corresponding to the historical maintenance-related pattern; based on an adaptive similarity threshold, computer-identifying a selected set of historical maintenance-related patterns from the digital maintenance records database as corresponding to the current maintenance-related pattern; and computer-identifying a selected aircraft part associated with the selected set of historical maintenance-related patterns in the digital maintenance records database as a candidate for replacement on the aircraft to address the current maintenance-related pattern. In this example or any other example, computer-identifying the selected set of historical maintenance-related patterns based on the adaptive similarity threshold includes searching the plurality of historical maintenance-related patterns of the digital maintenance records database for a candidate maintenance-related pattern that satisfies one or more relevance criteria, the one or more relevance criteria including a similarity score relative to the current maintenance-related pattern that exceeds a threshold similarity score. In this example or any other example, the similarity score is calculated by computing either or both of a Jaccard similarity and a cosine similarity between the current maintenance-related pattern and the candidate maintenance-related pattern. In this example or any other example, upon identifying the candidate maintenance-related pattern that satisfies the one or more relevance criteria, the candidate maintenance-related pattern is selected for inclusion in the selected set of historical maintenance-related patterns corresponding to the current maintenance-related pattern. In this example or any other example, the one or more relevance criteria further include association with a corresponding aircraft part that has at least a threshold number of prior documented replacements for the candidate maintenance-related pattern, and has at least a threshold fault-resolution likelihood based on the prior documented replacements. In this example or any other example, the method further comprises, upon failing to identify any candidate maintenance-related patterns satisfying the one or more relevance criteria, conducting one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches. In this example or any other example, the one or more subsequent searches continue until the candidate maintenance-related pattern is identified, or the subsequent threshold similarity score is reduced to a minimum threshold similarity score. In this example or any other example, the one or more subsequent relevance criteria further include association with a corresponding aircraft part that has at least a subsequent threshold number of prior documented replacements for the candidate maintenance-related pattern, and has at least a subsequent threshold fault-resolution likelihood based on the prior documented replacements. In this example or any other example, the method further comprises: receiving a current sensor-related pattern, the current sensor-related pattern including a set of one or more digital sensor values reported during the flight of the aircraft; comparing the current sensor-related pattern to a digital sensor records database including a plurality of historical sensor-related patterns observed during the prior aircraft flights; computer-identifying a selected set of historical sensor-related patterns from the digital sensor records database as corresponding to the current sensor-related pattern; and computer-identifying a second selected aircraft part associated with the selected set of historical sensor-related patterns in the digital sensor records database as a second candidate for replacement on the aircraft to address the current sensor-related pattern. In this example or any other example, the set of one or more digital sensor values of the current sensor-related pattern each exceed a historical nominal range for a corresponding sensor type. In this example or any other example, the method further comprises outputting a part replacement recommendation that recommends replacement of either the selected aircraft part or the second selected aircraft part, based on whichever of the selected aircraft part or the second selected aircraft part has a higher fault-resolution likelihood as compared to other aircraft parts associated with the selected set of historical maintenance-related patterns or the selected set of historical sensor-related patterns. In this example or any other example, the selected set of historical maintenance-related patterns is further identified based at least on performing sequential pattern mining to identify historical maintenance-related patterns of the digital maintenance records database having higher than a threshold sequence similarity to the current maintenance-related pattern. In this example or any other example, the current maintenance-related pattern further includes one or more FDEs (Flight Deck Effects) reported during the flight of the aircraft. In this example or any other example, the current maintenance-related pattern is associated with an aircraft identifier for the aircraft, and a flight identifier for the flight on which the current maintenance-related pattern was observed.

In an example, a computing device comprises: a logic subsystem; and a storage subsystem holding instructions executable by the logic subsystem to: receive a current maintenance-related pattern that includes a set of one or more digital maintenance messages reported during a flight of an aircraft; compare the current maintenance-related pattern to a digital maintenance records database, the digital maintenance records database including a plurality of historical maintenance-related patterns observed during prior aircraft flights, the plurality of historical maintenance-related patterns each having a same digital data format as the current maintenance-related pattern, and each historical maintenance-related pattern associated with an indication of one or more aircraft parts that, when replaced, resolved an underlying fault corresponding to the historical maintenance-related pattern; based on an adaptive similarity threshold, computer-identify a selected set of historical maintenance-related patterns from the digital maintenance records database as corresponding to the current maintenance-related pattern; and computer-identify a selected aircraft part associated with the selected set of historical maintenance-related patterns in the digital maintenance records database as a candidate for replacement on the aircraft to address the current maintenance-related pattern. In this example or any other example, computer-identifying the selected set of historical maintenance-related patterns based on the adaptive similarity threshold includes searching the plurality of historical maintenance-related patterns of the digital maintenance records database for a candidate maintenance-related pattern that satisfies one or more relevance criteria, the one or more relevance criteria including a similarity score relative to the current maintenance-related pattern that exceeds a threshold similarity score. In this example or any other example, upon failing to identify any candidate maintenance-related patterns satisfying the one or more relevance criteria, the instructions are further executable to conduct one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches. In this example or any other example, the one or more subsequent searches continue until the candidate maintenance-related pattern is identified, or the subsequent threshold similarity score is reduced to a minimum threshold similarity score. In this example or any other example, the instructions are further executable to output a recommendation to replace the selected aircraft part.

In an example, a method for computerized aircraft fault isolation comprises: at a computing device, receiving a current maintenance-related pattern, the current maintenance-related pattern including a set of one or more digital maintenance messages reported during a flight of an aircraft; searching a digital maintenance records database for a candidate maintenance-related pattern that satisfies one or more relevance criteria, the one or more relevance criteria including a similarity score relative to the current maintenance-related pattern that exceeds a threshold similarity score, wherein the digital maintenance records database includes a plurality of historical maintenance-related patterns observed during prior aircraft flights, the plurality of historical maintenance-related patterns each have a same digital data format as the current maintenance-related pattern, and each historical maintenance-related pattern is associated with an indication of one or more aircraft parts that, when replaced, resolved an underlying fault corresponding to the historical maintenance-related pattern; upon failing to identify any candidate maintenance-related patterns satisfying the one or more relevance criteria, conducting one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches; and upon identifying the candidate maintenance-related pattern satisfying the one or more subsequent relevance criteria, computer-identifying a selected aircraft part associated with the candidate maintenance-related pattern in the digital maintenance records database as a candidate for replacement on the aircraft to address the current maintenance-related pattern.

The invention claimed is:
1. A method for computerized aircraft fault isolation, the method comprising:

at a computing device, receiving a current maintenance-related pattern, the current maintenance-related pattern including a set of one or more digital maintenance messages reported during a flight of an aircraft;

comparing the current maintenance-related pattern to a digital maintenance records database, the digital maintenance records database including a plurality of historical maintenance-related patterns observed during prior aircraft flights, the plurality of historical maintenance-related patterns each having a same digital data format as the current maintenance-related pattern, and each historical maintenance-related pattern associated with an indication of one or more aircraft parts that, when replaced, resolved an underlying fault corresponding to the historical maintenance-related pattern;

based on an adaptive similarity threshold, computer-identifying a selected set of historical maintenance-related patterns from the digital maintenance records database as corresponding to the current maintenance-related pattern; and computer-identifying a selected aircraft part associated with the selected set of historical maintenance-related patterns in the digital maintenance records database as a candidate for replacement on the aircraft to address the current maintenance-related pattern, wherein the selected aircraft part is computer-identified based at least in part on a number of prior documented replacements of the selected aircraft part in the digital maintenance records database, and a fault-resolution likelihood for the selected aircraft part.

2. The method of claim 1, wherein computer-identifying the selected set of historical maintenance-related patterns based on the adaptive similarity threshold includes searching the plurality of historical maintenance-related patterns of the digital maintenance records database for a candidate maintenance-related pattern that satisfies one or more relevance criteria, the one or more relevance criteria including a similarity score relative to the current maintenance-related pattern that exceeds a threshold similarity score.

3. The method of claim 2, wherein the similarity score is calculated by computing either or both of a Jaccard similarity and a cosine similarity between the current maintenance-related pattern and the candidate maintenance-related pattern.

4. The method of claim 2, wherein, upon identifying the candidate maintenance-related pattern that satisfies the one or more relevance criteria, the candidate maintenance-related pattern is selected for inclusion in the selected set of historical maintenance-related patterns corresponding to the current maintenance-related pattern.

5. The method of claim 2, wherein the selected aircraft part is associated with the candidate maintenance-related pattern in the digital maintenance records database, and wherein the one or more relevance criteria include the number of prior documented replacements exceeding a threshold number of prior documented replacements, and the fault-resolution likelihood exceeding a threshold fault-resolution likelihood.

6. The method of claim 2, further comprising, upon failing to identify any candidate maintenance-related patterns satisfying the one or more relevance criteria, conducting one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches.

7. The method of claim 6, wherein the one or more subsequent searches continue until the candidate maintenance-related pattern is identified, or the subsequent threshold similarity score is reduced to a minimum threshold similarity score.

8. The method of claim 6, wherein the one or more subsequent relevance criteria further include association with a corresponding aircraft part that has at least a subsequent threshold number of prior documented replacements for the candidate maintenance-related pattern, and has at least a subsequent threshold fault-resolution likelihood based on the prior documented replacements.

9. The method of claim 1, further comprising:

receiving a current sensor-related pattern, the current sensor-related pattern including a set of one or more digital sensor values reported during the flight of the aircraft;

comparing the current sensor-related pattern to a digital sensor records database including a plurality of historical sensor-related patterns observed during the prior aircraft flights;

computer-identifying a selected set of historical sensor-related patterns from the digital sensor records database as corresponding to the current sensor-related pattern; and computer-identifying a second selected aircraft part associated with the selected set of historical sensor-related patterns in the digital sensor records database as a second candidate for replacement on the aircraft to address the current sensor-related pattern.

10. The method of claim 9, wherein the set of one or more digital sensor values of the current sensor-related pattern each exceed a historical nominal range for a corresponding sensor type.

11. The method of claim 9, further comprising outputting a part replacement recommendation that recommends replacement of either the selected aircraft part or the second selected aircraft part, based on whichever of the selected aircraft part or the second selected aircraft part has a higher fault-resolution likelihood as compared to other aircraft parts associated with the selected set of historical maintenance-related patterns or the selected set of historical sensor-related patterns.

12. The method of claim 1, wherein the selected set of historical maintenance-related patterns is further identified based at least on performing sequential pattern mining to identify historical maintenance-related patterns of the digital maintenance records database having higher than a threshold sequence similarity to the current maintenance-related pattern.

13. The method of claim 1, wherein the current maintenance-related pattern further includes one or more FDEs (Flight Deck Effects) reported during the flight of the aircraft.

14. The method of claim 1, wherein the current maintenance-related pattern is associated with an aircraft identifier for the aircraft, and a flight identifier for the flight on which the current maintenance-related pattern was observed.

15. A computing device, comprising:

a logic subsystem; and a storage subsystem holding instructions executable by the logic subsystem to:

receive a current maintenance-related pattern that includes a set of one or more digital maintenance messages reported during a flight of an aircraft;

compare the current maintenance-related pattern to a digital maintenance records database, the digital maintenance records database including a plurality of historical maintenance-related patterns observed during prior aircraft flights, the plurality of historical maintenance-related patterns each having a same digital data format as the current maintenance-related pattern, and each historical maintenance-related pattern associated with an indication of one or more aircraft parts that, when replaced, resolved an underlying fault corresponding to the historical maintenance-related pattern;

based on an adaptive similarity threshold, computer-identify a selected set of historical maintenance-related patterns from the digital maintenance records database as corresponding to the current maintenance-related pattern; and computer-identify a selected aircraft part associated with the selected set of historical maintenance-related patterns in the digital maintenance records database as a candidate for replacement on the aircraft to address the current maintenance-related pattern, wherein the selected aircraft part is computer-identified based at least in part on a number of prior documented replacements of the selected aircraft part in the digital maintenance records database, and a fault-resolution likelihood for the selected aircraft part.

16. The computing device of claim 15, wherein computer-identifying the selected set of historical maintenance-related patterns based on the adaptive similarity threshold includes searching the plurality of historical maintenance-related patterns of the digital maintenance records database for a candidate maintenance-related pattern that satisfies one or more relevance criteria, the one or more relevance criteria including a similarity score relative to the current maintenance-related pattern that exceeds a threshold similarity score.

17. The computing device of claim 16, wherein, upon failing to identify any candidate maintenance-related patterns satisfying the one or more relevance criteria, the instructions are further executable to conduct one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches.

18. The computing device of claim 17, wherein the one or more subsequent searches continue until the candidate maintenance-related pattern is identified, or the subsequent threshold similarity score is reduced to a minimum threshold similarity score.

19. The computing device of claim 15, where the instructions are further executable to output a recommendation to replace the selected aircraft part.

20. A method for computerized aircraft fault isolation, the method comprising:

at a computing device, receiving a current maintenance-related pattern, the current maintenance-related pattern including a set of one or more digital maintenance messages reported during a flight of an aircraft;

searching a digital maintenance records database for a candidate maintenance-related pattern that satisfies one or more relevance criteria, the one or more relevance criteria including a similarity score relative to the current maintenance-related pattern that exceeds a threshold similarity score, wherein the digital maintenance records database includes a plurality of historical maintenance-related patterns observed during prior aircraft flights, the plurality of historical maintenance-related patterns each have a same digital data format as the current maintenance-related pattern, and each historical maintenance-related pattern is associated with an indication of one or more aircraft parts that, when replaced, resolved an underlying fault corresponding to the historical maintenance-related pattern;

upon failing to identify any candidate maintenance-related patterns satisfying the one or more relevance criteria, conducting one or more subsequent searches of the digital maintenance records database to identify a candidate maintenance-related pattern satisfying one or more subsequent relevance criteria, the one or more subsequent relevance criteria including a subsequent threshold similarity score that is iteratively reduced for each of the one or more subsequent searches; and upon identifying the candidate maintenance-related pattern satisfying the one or more subsequent relevance criteria, computer-identifying a selected aircraft part associated with the candidate maintenance-related pattern in the digital maintenance records database as a candidate for replacement on the aircraft to address the current maintenance-related pattern, wherein the selected aircraft part is computer-identified based at least in part on a number of prior documented replacements of the selected aircraft part in the digital maintenance records database, and a fault-resolution likelihood for the selected aircraft part.

* * * * *